United States Patent [19]

Patisaul et al.

[11] 4,183,054
[45] Jan. 8, 1980

[54] DIGITAL, FREQUENCY-TRANSLATED, PLURAL-CHANNEL, VESTIGIAL SIDEBAND TELEVISION COMMUNICATION SYSTEM

[75] Inventors: Charles R. Patisaul; Fred R. McDevitt, both of Melbourne, Fla.; Edwin R. Tarmain, London; Donald G. Monteith, Aylmer, both of Canada

[73] Assignee: Harris Corporation, Cleveland, Ohio

[21] Appl. No.: 838,091

[22] Filed: Sep. 30, 1977

[51] Int. Cl.² .......................... H04N 7/10; H04B 7/14; H04B 1/68; H04J 3/00

[52] U.S. Cl. .......................................... 358/86; 325/9; 325/10; 325/11; 325/50; 343/204

[58] Field of Search ................ 358/86; 325/9, 10, 11, 325/50; 343/204

[56] References Cited

U.S. PATENT DOCUMENTS

| | | | |
|---|---|---|---|
| 3,665,316 | 5/1972 | Jeffers | 325/11 |
| 3,715,664 | 2/1973 | Ikrath | 325/10 |
| 3,824,597 | 7/1974 | Berg | 343/204 |
| 4,002,980 | 1/1977 | Herz | 325/9 |
| 4,004,078 | 1/1977 | Gorog | 250/199 |
| 4,062,043 | 12/1977 | Zeidler | 358/86 |
| 4,074,127 | 2/1978 | Mochida | 250/199 |

Primary Examiner—Howard W. Britton
Attorney, Agent, or Firm—Craig and Antonelli

[57] ABSTRACT

A television communication system distributes plural VSB digitally encoded TV channels via an optical transmission link to one or more distribution terminals. At the headend the frequency band of each of the VSB signals is shifted down to baseband and transmitted in digital format. At each station along the network, the digitized baseband VSB television signal is converted into analog format and then reshifted through an up-converter to its original IF band so as to be compatible with the television receiver circuitry of the subscribers served by the distribution station. Advantageously, the present invention may employ optical communication techniques for coupling the digitally encoded frequency-shifted VSB television signals between stations. To maintain signal strength and quality, repeater units may be located in the optical communication link. Each repeater converts an incoming optical signal to an electrical signal for amplification and then reconverts the improved electrical signal back into optical form for further transmission along the link.

36 Claims, 4 Drawing Figures

DIGITAL, FREQUENCY-TRANSLATED, PLURAL-CHANNEL, VESTIGIAL SIDEBAND TELEVISION COMMUNICATION SYSTEM

FIELD OF THE INVENTION

The present invention relates to communication systems, especially one for transmitting vestigial sideband television signals over an optical communication link in digital format.

BACKGROUND OF THE INVENTION

Television communication systems presently employ vestigial sideband (hereinafter referred to as VSB), or asymmetric-sideband, modulation wherein a portion of one sideband (usually the lower sideband) is largely suppressed. A typical VSB television channel has the picture carrier located somewhere in the VHF or UHF band, depending upon the channel assignment, with a 25 KHz FM modulated sound carrier displaced on the unsuppressed sideband side of the picture carrier by 4.5 MHz. One exemplary type of television communication system is the cable television network, wherein multi-channel television signals are transmitted from the system headend along a network of distribution points each serving a plurality of subscribers, with coupling between stations being effected over cable conductor links. In order to avoid signal degradation, some means must be provided to maintain required signal strength between stations. Unfortunately, the simple use of repeaters has not proved satisfactory, due to substantial repeater distortion which renders the quality of transmitted analog signals unacceptable.

To obviate this drawback, digital conversion schemes have been proposed wherein the original VSB television signals are demodulated at an originating station, converted into digital format, and then transmitted to a distribution point. At the distribution point, the received digital signals may then be converted back into analog format and then modulated by a VSB modulator, so that the analog signals will be compatable with the subscribers television receiver circuits. A significant drawback to this digital approach is the need for VSB demodulation and modulation circuitry at each station along the communication network for each channel handled by the network in order to bring the sampling rate of the television signals down to a value that can be handled by available analog/digital conversion equipment. VSB modulation/demodulation circuitry is an expensive and complex part of the equipment required at each station, and where a large number of channels are to be served, even the apparently improved digital approach to maintaining signal quality while expanding a service area is subject to economic restrictions.

SUMMARY OF THE INVENTION

In accordance with the present invention, the advantages of digital communication techniques are implemented in a television communication system without suffering from the drawbacks described above. Specifically, the need for multiple VSB demodulation/modulation circuitry for each channel at each distribution/coupling station along the network is obviated by shifting the frequency band of the VSB signals down to baseband and transmitting the baseband in digital format. At each station along the network, the digitized baseband VSB television signal is converted into analog format and then reshifted through an up-converter to its original IF band so as to be compatible with the television receiver circuitry of the subscribers served by the distribution station. Advantageously, the present invention may employ optical communication techniques for coupling the digitally encoded frequency-shifted VSB television signals between stations. To maintain signal strength and quality, repeater units may be located in the optical communication link. Each repeater converts an incoming optical signal to an electrical signal for amplification and processing and then reconverts the improved electrical signal back into optical form for further transmission along the link. Thus, by maintaining the VSB format of the television signals and digitally transmitting the VSB signals over an optical communication link, the television communication system of the present invention is capable of distributing a large number of channels over a vast geographical area without the need for complex, bulky, and prohibitively expensive station equipment.

DETAILED DESCRIPTION

Figure 1:
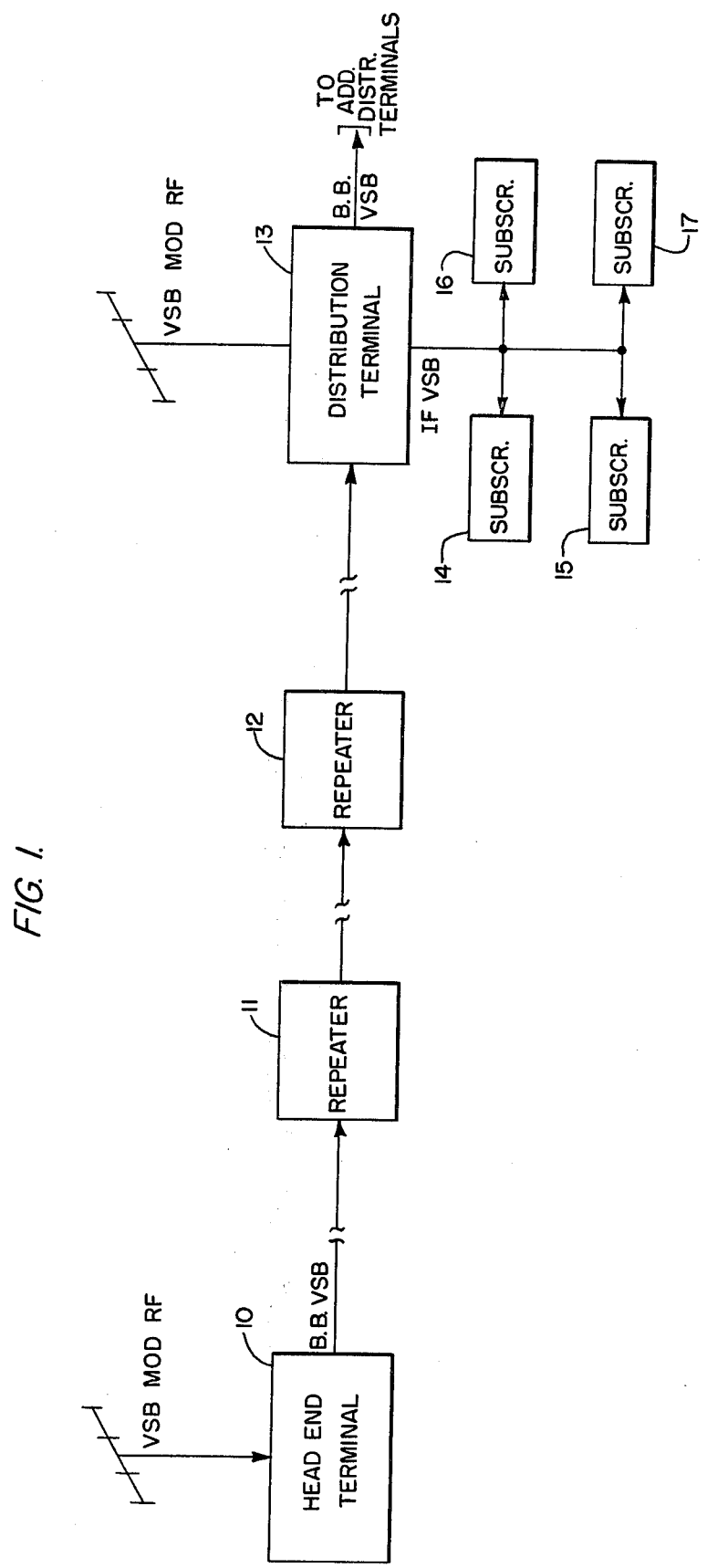
FIG. 1 is a schematic block diagram of a multichannel communication network for transmitting baseband-shifted VSB digital signals.
Figure 2:
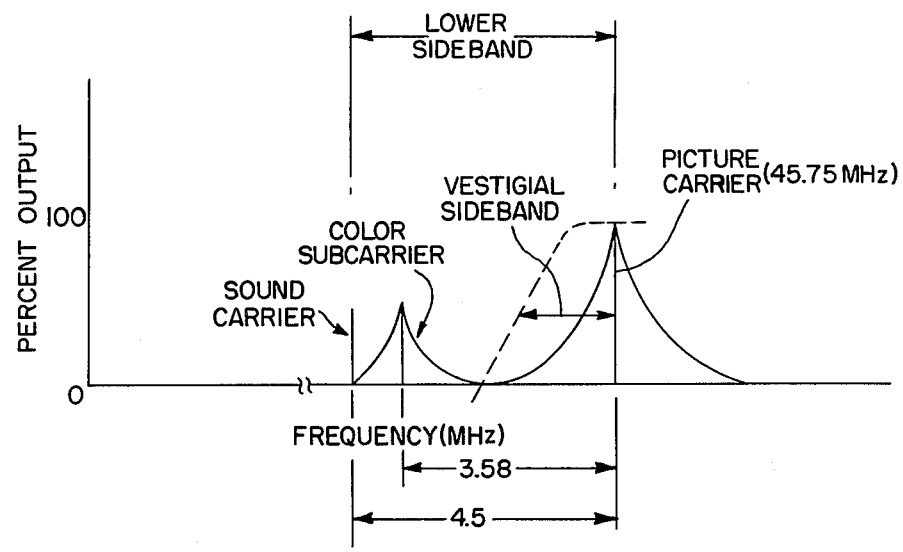
FIG. 2 is a spectrum plot of a typical vestigial sideband television channel.

Referring now to FIG. 1, there is shown a general schematic block diagram of a multi-channel communication network in accordance with the present invention. At a headend terminal 10, radio frequency signals from a remote RF transmitter carrying the VSB television signals are received for transmission by the headend terminal 10 to a distribution terminal 13, geographically separated from the headend terminal 10. The headend terminal 10 initially down converts the VSB modulated RF signals to the required intermediate frequency band. Thus, a VSB channel may have a spectrum distribution as shown in FIG. 2, wherein an exemplary composite NTSC VSB video signal and its sound subcarrier are illustrated.

Figure 3:
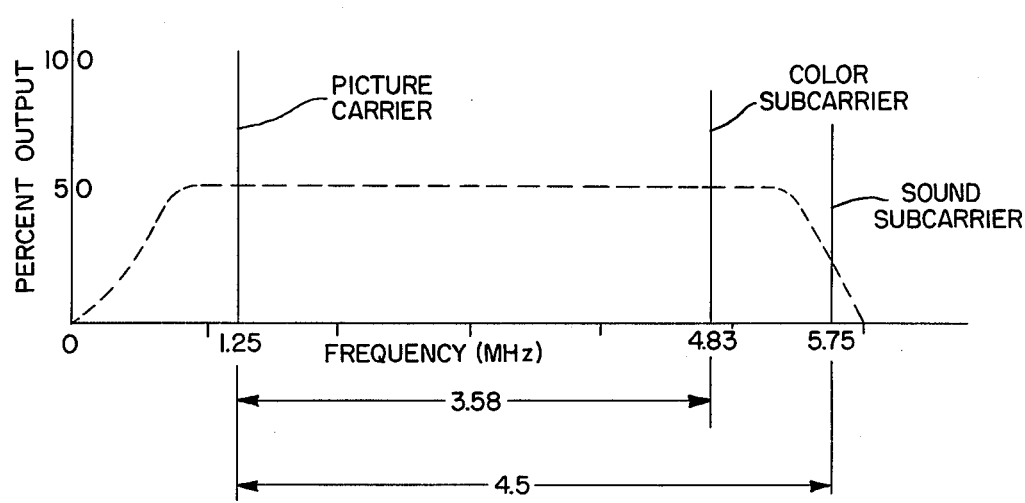
FIG. 3 is a spectrum plot of a baseband-shifted vestigial sideband television channel.

The picture carrier is centered at an IF frequency of 45.75 MHz with the sound subcarrier displaced therefrom by 4.5 MHz at 41.25 MHz. The color subcarrier is located at 42.17 MHz, shifted from the picture carrier by 3.58 MHz. The headend terminal 10 down converts this IF composite to baseband to obtain a composite VSB picture and sound spectrum output as shown in FIG. 3, wherein the picture carrier is shown as having been down shifted to 1.25 MHz, with the color and sound subcarriers shifted to 4.83 and 5.75 MHz, respectively. The baseband VSB output is digitized and then applied to electrooptic conversion components such as light emitting diodes to obtain a digitally encoded optical transmission signal. This optical transmission signal is coupled over an optical fiber medium to distribution terminal 13. Repeater components such as repeaters 11 and 12 may be inserted in the link, as required to provide the necessary signal amplification for transmission. For this purpose, each repeater may include an optical-electro transducer element, such as a light responsive photo diode, coupled to the optical fiber medium, for converting a received optical signal into an electrical signal. The electrical signal is then amplified and reconverted into an optical signal by again modulating an electro-optical element, such as a light emitting diode coupled to an output optical fiber transmission medium.

The distribution terminal 13 may incorporate an optical-electrical transducer element of the type employed in the repeater to derive the digital VSB baseband signal transmitted from headend terminal 10. This digital signal may then be converted into analog form and up-converted to the IF band for distribution to local subscribers 14 through 17 served by distribution terminal 13. In addition, distribution terminal 13 may include repeater circuitry for transmitting the received digital baseband VSB channel to a further distribution terminal. The up-converted VSB analog signal may also be supplied to an RF transmitter for further radio wave transmission.

As was pointed out previously, since the make-up of each channel transmitted between terminals is in the form of a VSB modulated signal, essentially all that is required for coupling the signal to a subscriber's receiver is D/A conversion circuitry and simple up-converting mixer circuitry, the need for VSB demodulation/modulation circuitry for each channel, at each terminal, having been eliminated.

Figure 4:
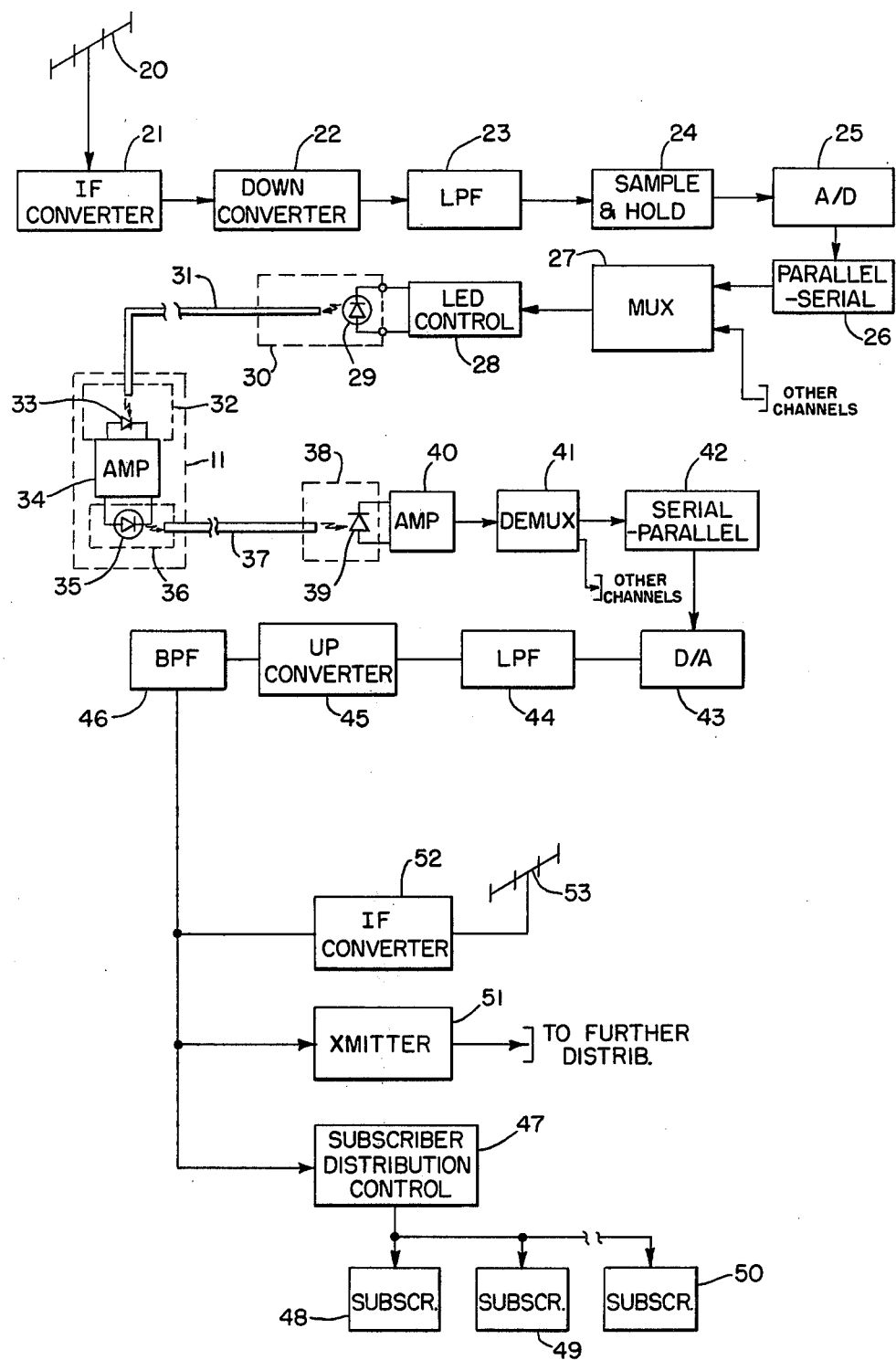
FIG. 4 is a detailed schematic block diagram of the overall system configuration.

Referring now to FIG. 4, wherein a detailed schematic block diagram of the inventive system is shown, a VSB modulated television carrier may be received at antenna 20 and coupled to IF converter 21. Converter 21 extracts the VSB modulation from the RF carrier and supplies the IF signal to a down-converter 22. Down converter 22 contains the necessary mixer and local oscillator circuitry to down-convert or down-shift the spectrum characteristics of the received VSB channel, as shown in FIG. 2, for example, to a baseband spectrum as shown in FIG. 3, for example. The baseband-shifted VSB channel is then filtered and appropriately amplified in low pass filter circuit 23, and supplied to sample and hold circuit 24. Sample and hold circuit 24 and analog to digital converter 25 effectively convert the sampled baseband VSB channel signal into digital form. Each digital sample of the VSB analog signal is converted into serial form by parallel to serial converter 26 and applied to multiplexer 27. Multiplexer 27 also receives digitized VSB signals from other channels and effects a time division multiplexing of its incoming channels for transmission. The multiplexed channel signals from multiplexer 27 are applied to a light-emitting diode (LED) control circuit 28 which causes LED 29 to generate encoded signal optical signals. LED 29 is thereby modulated in accordance with the multiplexed digital representations of the baseband-shifted VSB channels and its optical output is applied to optical fiber 31 by way of an apropriate optical fiber coupler fixture, shown by broken lines 30. Optical fiber 31 may be part of a multi-optical fiber cable carrying a plurality of signals to a geographically separated distribution terminal.

Between the transmitting headend terminal and a receiving distribution terminal, there may be provided one or more repeater stations, as shown in FIG. 1, a single repeater 11 being schematically shown in FIG. 4 by broken lines.

Each repeater station is coupled to the optical fiber cable and may include a fiber coupler fixture 32 for aligning a respective fiber with a photodetector, such as light-responsive photo diode 33. Diode 33 converts the received digital optical signals into electrical signals which are amplified in amplifier 34 and then applied to a further light emitting diode 35. Each LED 35 is coupled through an appropriate fiber coupler 36 to a respective optical fiber 37 of a multi-fiber cable which is connected to a further repeater or a distribution terminal.

At the distribution terminal, optical fiber 37 is coupled by way of a suitable coupling fixture 38 to a light responsive element such as photo diode 39, which converts the received optical signal into an electrical output. This output is then amplified in amplifier 40. The amplified electrical digital VSB baseband-shifted signal from amplifier 40 is then demultiplexed 41 by demultiplexer into the digital signals representative of sequentially transmitted VSB samples for each respective channel. The processing of an individual channel is initially effected by serial/parallel converter 42 and digital-analog converter 43 which generate an analog baseband-shifted VSB channel signal. Any unwanted high-frequency components are removed by low pass filter 44 and then the signal is shifted in frequency by up-converter 45 from its baseband position, as shown in FIG. 3, up to its IF spectrum position, as shown in FIG. 2. Refinement of the spectrum characteristics is provided by way of IF band pass filter 46, so that, at the output of bandpass filter 46, there is obtained the desired analog composite VSB channel signal which is compatible with the VSB demodulation circuitry of the receivers of the subscribers served by the distribution terminal. This signal may now be supplied to the subscribers' receivers, such as 48, 49 and 50, by way of the appropriate distribution control network 47.

In addition, the VSB signal may be relayed on to further distribution terminals by any of a transmitter 51 identical to that used at the headed, described previously. Where radio wave transmission from the distribution terminal is desired, the VSB IF signal can be transmitted over an RF carrier via IF converter 52 and antenna 53.

As will be appreciated by those skilled in the art, the present invention enables the distribution of a plurality of television channels to subscribers dispersed over a large geographical area, without the need for a large amount of expensive and complex VSB modulation/demodulation circuitry. The shifting of the original VSB IF channels down to base band affords the use of digital modulation techniques which are readily adaptable to optical communication highways.

While we have shown and described an embodiment in accordance with the present invention, it is understood that the same is not limited thereto but is susceptible of numerous changes and modifications as know to a person skilled in the art, and we therefore do not wish to be limited to the details shown and described herein but intend to cover all such changes and modifications as are obvious to one of ordinary skill in the art.

We claim:
1. A communication system comprising:
   first means, disposed at a transmitting station, coupled to receive intermediate frequency range vestigial sideband modulation information signals, for shifting said vestigial sideband modulated information signals to baseband frequency range;
   second means, coupled to said first means, for converting said baseband-shifted vestigial sideband modulation information signals into prescribed transmission signals representative thereof and causing said prescribed transmission signals to be transmitted to a receiving station;

third means, disposed at said receiving station, for converting prescribed transmission signals transmitted from said second means into baseband-shifted vestigial sideband modulation information signals; and fourth means, coupled to said third means, for shifting the baseband-shifted vestigial sideband modulation information signals obtained by said third means to intermediate frequency range vestigial sideband modulation information signals.

2. A communication system according to claim 1, wherein said information signals include television signals and said prescribed transmission signals comprise digital signals representative of said baseband-shifted vestigial sideband modulation television signals.

3. A communication system according to claim 2, wherein said second means includes means for converting said digital signals into optical format and causing the optical digital signals to be transmitted to said receiving station.

4. A communication system according to claim 3, wherein said third means includes means for converting received optical digital signals transmitted from said receiving station into electrical format.

5. A communication system according to claim 3, further including fifth means, disposed at a repeater station located between said transmitting and receiving stations, for converting said optical digital signals into electrical format, amplifying the converted digital signals and converting the amplified signals back into optical format for transmission to said receiving station.

6. A communication system according to claim 1, wherein said second means includes means, coupled to receive a plurality of respective baseband-shifted vestigial sideband modulation digital television signals and multiplexing said signals and converting said multiplexed signals into optical format for transmission to said receiving station.

7. A communication system according to claim 6, wherein said third means includes means for converting received optical signals into electrical format and demultiplexing said electrical signals in accordance with the respective television channels assigned thereto for distribution to said fourth means to be shifted to said intermediate frequency range vestigial sideband modulation television signals.

8. A method of conveying information from a transmitting station to a receiving station comprising the steps of:

(1) at said transmitting station, shifting intermediate frequency range vestigial sideband modulation information signals to the baseband frequency range, (2) converting the baseband-shifted vestigial sideband modulation information signals into prescribed transmission signals representative thereof and transmitting said baseband-shifted signals to said receiving station, (3) at said receiving station, receiving the signals transmitted from said transmission station and converting the received signals into baseband-shifted vestigial sideband modulation information signals, and (4) shifting the baseband-shifted vestigial sideband modulation information signals to the intermediate frequency range, and thereby obtain the original vestigial sideband modulation information signals.

9. A method according to claim 8, wherein said information signals include television signals and said prescribed transmission signals comprise digital signals representative of said baseband-shifted vestigial sideband modulation television signals.

10. A method according to claim 8, wherein said transmitting step includes the step of converting said digital television baseband-shifted vestigial sideband modulation signals into optical format and causing the optical digital signals to be transmitted to said receiving station.

11. A method according to claim 10, further including the step of, at a repeater station disposed between said transmitting and receiving stations, converting the optical digital transmitted signals from said transmitting station into electrical format, amplifying the converted digital signals, and then reconverting the amplified signals back into optical format for further transmission to said receiving station.

12. A method according to claim 11, wherein, at said receiving station, said step of receiving includes converting the received optical digital signals into electrical format for subsequent conversion into baseband-shifted vestigial sideband modulation information signals and shifting said baseband-shifted signals to the intermediate frequency range.

13. A communication system comprising:

first means, disposed at a transmitting station and coupled to receive vestigial sideband modulation information signals at a first frequency range for shifting said vestigial sideband modulation information signals to a second frequency range lower than said first frequency range;

second means, coupled to said first means, for converting said second frequency range-shifted vestigial sideband modulation information signals into prescribed transmission signals representative thereof and causing said prescribed transmission signals to be transmitted to a receiving station;

third means, disposed at said receiving station, for converting prescribed transmission signals transmitted from said second means into second frequency range-shifted vestigial sideband modulation information signals; and fourth means, coupled to said third means, for shifting the second frequency range-shifted vestigial sideband modulation information signals obtained by said third means to first frequency range vestigial sideband modulation information signals.

14. A communication system according to claim 13, wherein said prescribed transmission signals comprise digital signals representative of said second frequency range-shifted vestigial sideband modulation information signals.

15. A communication system according to claim 13, wherein said second frequency range is lower than the radio frequency range.

16. A communication system according to claim 13, wherein said second frequency range is lower than the intermediate frequency range.

17. A communication system according to claim 13, wherein said first frequency range is greater than the intermediate frequency range.

18. A communication system according to claim 13, wherein said first frequency range is greater than frequencies below the intermediate frequency range.

19. A communication system according to claim 13, wherein said second frequency range is lower than the intermediate frequency range.

20. A communication system according to claim 14, wherein said information signals include television signals.

21. A communication system according to claim 14, wherein said second means includes means for converting said digital signals into optical format and causing the optical digital signals to be transmitted to said receiving station.

22. A communication system according to claim 21, wherein said third means includes means for converting received optical digital signals transmitted from said receiving station into electrical format.

23. A communication system according to claim 21, further including fifth means, disposed at a repeater station located between said transmitting and receiving stations, for converting said optical digital signals into electrical format, amplifying the converted digital signals and converting the amplified signals back into optical format for transmission to said receiving station.

24. A communication system according to claim 13, wherein said second means includes means, coupled to receive a plurality of respective second frequency range-shifted vestigial sideband modulation digital television signals and multiplexing said signals and converting said multiplexed signals into optical format for transmission to said receiving station.

25. A communication system according to claim 24, wherein said third means includes means for converting received optical signals into electrical format and demultiplexing said electrical signals in accordance with the respective television channels assigned thereto for distribution to said fourth means to be shifted to first frequency range vestigial sideband modulation television signals.

26. A method of conveying information from a transmitting station to a receiving station comprising the steps of:
    at said transmitting station, shifting vestigial sideband modulation information signals at a first frequency range to a second frequency range lower than said first frequency range;
    converting the second frequency range-shifted vestigial sideband modulation information signals into prescribed transmission signals representative thereof and transmitting said second frequency range-shifted signals to said receiving station;
    at said receiving station, receiving the signals transmitted from said transmission station and converting the received signals into second frequency range-shifted vestigial sideband modulation information signals; and
    shifting the second frequency range-shifted vestigial sideband modulation information signals to said first frequency range, and thereby obtain the original vestigial sideband modulation information signals.

27. A method according to claim 26, wherein said prescribed transmission signals comprise digital signals representative of said second frequency range-shifted vestigial sideband modulation information signals.

28. A method according to claim 26, wherein said second frequency range is lower than the radio frequency range.

29. A method according to claim 26, wherein said second frequency range is lower than the intermediate frequency range.

30. A method according to claim 26, wherein said first frequency range is greater than the intermediate frequency range.

31. A method according to claim 26, wherein said first frequency range is greaer than frequencies below the intermediate frequency range.

32. A method according to claim 26, wherein said second frequency range is lower than the intermediate frequency range.

33. A method according to claim 27, wherein said information signals include television signals.

34. A method according to claim 27, wherein said transmitting step includes the step of converting said digital second frequency range-shifted vestigial sideband modulation signals into optical format and causing the optical digital signals to be transmitted to said receiving station.

35. A method according to claim 34, further including the step of:
    at a repeater station disposed between said transmitting and receiving stations, converting the optical digital transmitted signals from said transmitting station into electrical format, amplifying the converted digital signals, and then reconverting the amplified signals back into optical format for further transmission to said receiving station.

36. A method according to claim 34, wherein, at said receiving station, said step of receiving includes converting the received optical digital signals into electrical format for subsequent conversion into second frequency range-shifted vestigial sideband modulation information signals and shifting said second frequency-shifted vestigial sideband modulation signals to said first frequency range.

* * * * *